United States Patent [19]
Barker

[11] 3,928,852
[45] Dec. 23, 1975

[54] RADIO NAVIGATION SYSTEM AND APPARATUS

[75] Inventor: A. Clifford Barker, Virginia Beach, Va.

[73] Assignee: Navidyne Corporation, Hampton, Va.

[22] Filed: Oct. 25, 1973

[21] Appl. No.: 409,363

[52] U.S. Cl. .......................... 343/105 R; 343/112 R
[51] Int. Cl.² .......................................... G01S 1/30
[58] Field of Search ...... 343/105 R, 105 H, 105 LS, 343/103 R, 112 R, 112 TC

[56] References Cited
UNITED STATES PATENTS

| | | | |
|---|---|---|---|
| 3,158,863 | 11/1964 | St. John White | 343/105 R |
| 3,161,880 | 12/1964 | Swanson et al. | 343/105 R |
| 3,599,212 | 8/1971 | Bickel et al. | 343/105 R |
| 3,680,115 | 7/1972 | Bickel et al. | 343/105 R |
| 3,803,610 | 4/1974 | Hastings et al. | 343/105 R |
| 3,808,597 | 4/1974 | Hastings et al. | 343/105 R |

Primary Examiner—Maynard R. Wilbur
Assistant Examiner—G. E. Montone
Attorney, Agent, or Firm—Shapiro and Shapiro

[57] ABSTRACT

A high-resolution compatible coastal confluence radio navigation system includes two local stations cooperable with a distant station of an Omega network or the like. The local stations, which are spaced by a distance substantially less than the usual long distance between Omega stations, transmit audio tone signals modulated on a high frequency carrier and directly or indirectly phase-locked to a signal received from the distant station. The phase relationships of the audio tones and a signal from the distant station are employed in a novel mobile receiver for deriving position information. Novel local station apparatus is also disclosed.

25 Claims, 6 Drawing Figures

RADIO NAVIGATION SYSTEM AND APPARATUS

BACKGROUND OF THE INVENTION

The invention relates to radio navigation systems and is more particularly concerned with a high-resolution coastal confluence navigation system including local stations cooperable with a remote transmitter of the type transmitting high power, V.L.F. Omega signals.

The Omega Navigation System includes a plurality of transmitting stations located in different parts of the world for providing a complete electronic global navigation aid. The operation of the system is described in an article entitled "The Omega Long Range Navigation System" by Williams, published in the Aug. 1973 issue of Safety at Sea International. The stations transmit the same Omega frequencies and are phase-locked to each other. Thus, measurement of the phase differences between Omega signals transmitted by the stations permits a navigator to locate his position with the aid of charts showing families of hyperbolic equi-phase lines corresponding to different pairs of the stations. For effecting world-wide coverage each of the stations has an operating range of at least 6,000 nautical miles. However, because the radio propagation paths are so long, propagation errors of considerable magnitude can occur. These errors vary with the time of day, the season, and the weather, and may cause errors of several miles in determining the position of a vessel.

It has been proposed to improve the accuracy of the system in a coastal area, for example, by measuring the propagation error at a monitor station in the coastal area and relaying the error information to vessels in the area by voice or automatic data link. However, systems of this type, referred to as "differential" Omega systems, have two drawbacks. First, the systems offer little or no compatibility with existing Omega receiving equipment. Second, the accuracy of the system is limited by the fact that three Omega stations must be used to obtain a fix, thereby limiting total accuracy to the residual error contribution of the weakest station. Although some of these systems have demonstrated accuracies of approximately 0.25 nautical mile, this accuracy is considered insufficient to fully meet maritime needs, particularly in bay approach areas.

BRIEF DESCRIPTION OF THE INVENTION

Accordingly, a principal object of the invention is to provide a high-accuracy coastal radio navigation system.

A further object of the invention is to provide a high-accuracy coastal navigation system which is compatible with existing Omega receiving equipment.

Another object of the invention is to provide improved radio navigation apparatus.

Briefly stated by way of example, in accordance with one aspect of the present invention first and second local stations are cooperable with a station of the type transmitting an Omega signal for forming a local navigation system, the local stations being spaced from each other by a distance which is substantially less than the usual long distance between Omega stations. The first local station is responsive to the transmitted Omega signal and generates a first local signal which is phase-locked to the Omega signal and which is transmitted as modulations of a carrier wave. The second local station includes means responsive to the first local signal for generating a second local signal which is phase-locked to the first local signal and which is also transmitted as modulations of a carrier wave. A mobile radio navigation receiver receives the Omega signal and both local signals and determine its position from the signal phase relationships.

BRIEF DESCRIPTION OF THE DRAWINGS

The invention will be further described with reference to the accompanying drawings, which illustrate preferred and exemplary embodiments, and wherein.

DETAILED DESCRIPTION OF THE INVENTION

Figure 1:
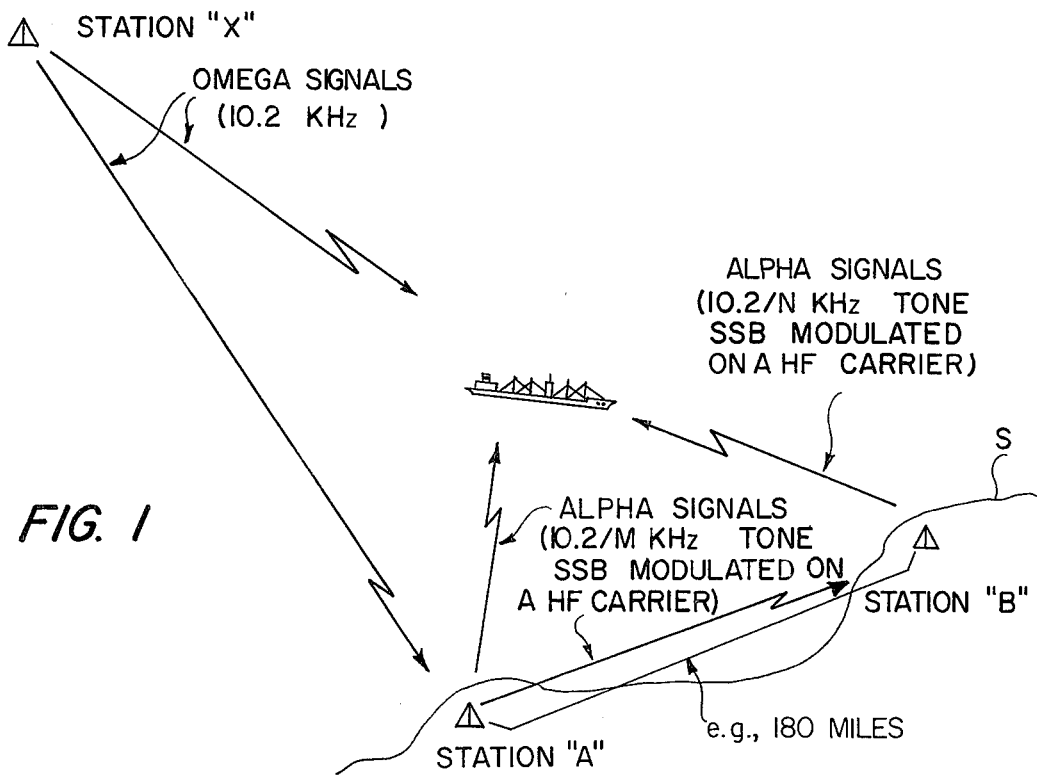
FIG. 1 is a view showing the relative positions of the stations which form the radio navigation system of the invention.
Figure 6:
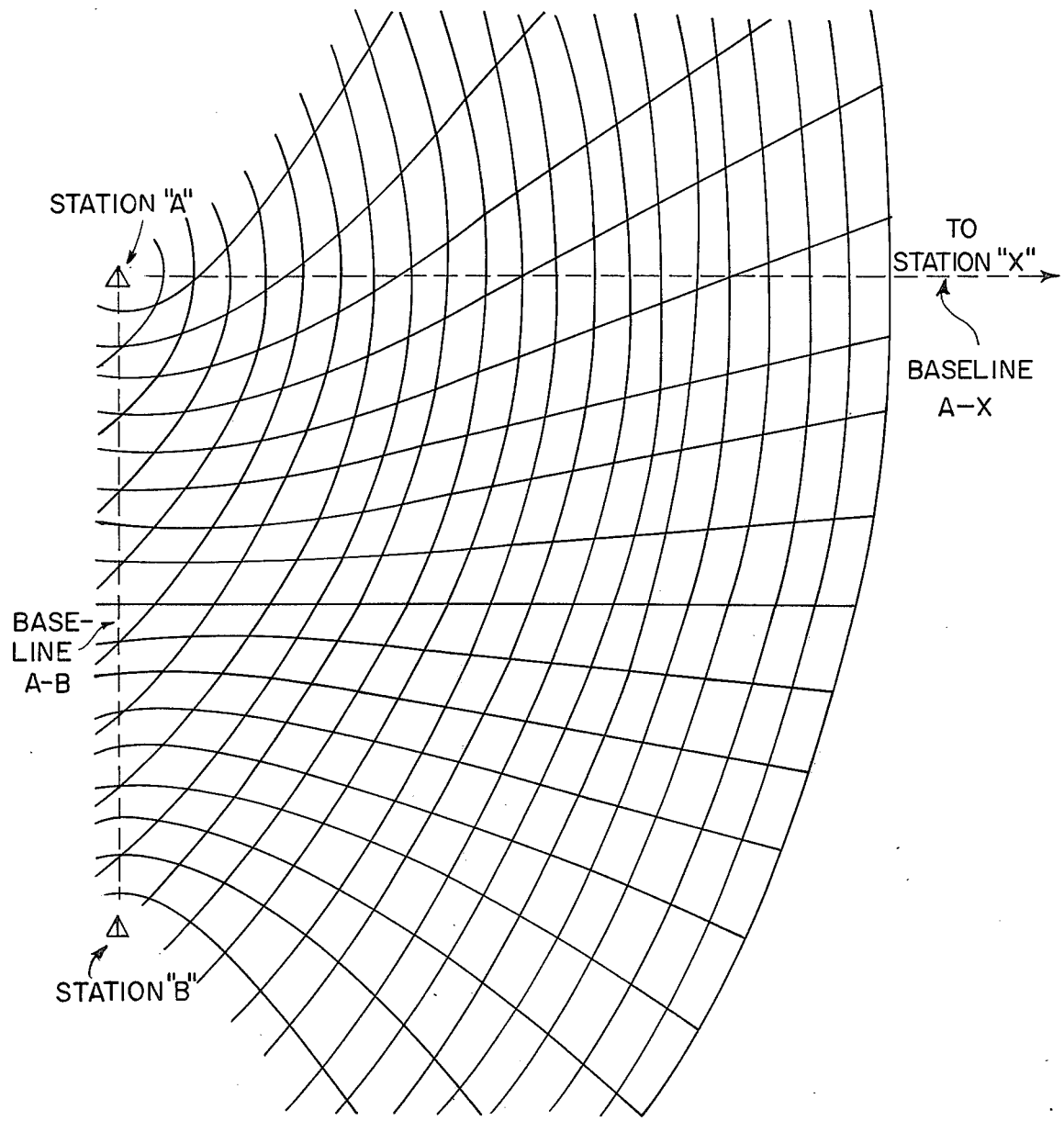
FIG. 6 is a diagram showing the lines-of-position formed by the navigation system of the invention.

Referring to the drawings, FIG. 1 depicts a preferred embodiment of the navigation system of the invention, showing the signal paths involved. A local-area hyperbolic line-of-position system (shown in FIG. 6) is established by two local stations A and B (hereinafter referred to as Alpha stations) spaced along a common shoreline S and cooperable with a single distant station X located seaward of the Alpha stations and preferably transmitting an Omega signal. A first base line (A–B in FIG. 6) is formed by the two Alpha stations. A second base line (A–X) is formed by the Omega station and, for best line-of-position geometry, the nearest of the two Alpha stations. The Alpha stations are spaced from each other by a distance which is substantially less than the distance between the Omega station X and the nearest Alpha station (or in the general case a distance substantially less than the distance between Omega stations). The problems of narrow lane width and geometric dilution of precision which characterize existing short-to-medium base line radio navigation systems are eliminated with the system of the invention. The 8–12 mile lane width characteristic of the Omega system is used, and, although the resulting line-of-position geometry is hyperbolic, the one extremely long base line (A–X) provides the advantage of excellent line-of-position intersections which actually become more rectangular with increasing distance from the Alpha stations. In practice, stations A and B provide coverage in a coastal area of approximately 10,000 square miles. Contiguous extension of the coverage area requires the addition of one shore station for each additional 10,000 square miles of coverage.

Both of the alpha stations transmit signals which are distinguishable from and directly or indirectly phase-locked to the Omega signal transmitted by station X. To this end, each of the Alpha stations may include a 10.2 kHz. receiver which is phase-locked to the Omega signal received from station X. However, in the preferred embodiment only Alpha station A contains a 10.2 kHz. receiver, Alpha station B being phase-locked to a stronger signal transmitted by Alpha station A for better local accuracy.

Figure 2:
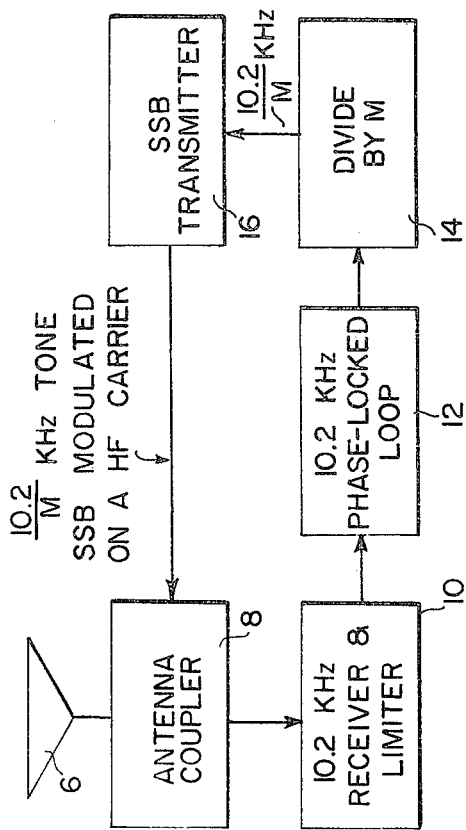
FIGS. 2 and 3 are block diagrams of the local stations of the invention.

As shown in FIG. 2, Alpha station A may include antenna 6, antenna coupler 8, and an Omega receiver and limiter 10 which is responsive to the Omega signal transmitited by station X. Because each Omega station transmits a 10.2 kHz. signal in a unique time slot of eight successive slots, receiver 10 may be provided with synchronizing means of the type utilized in conventional Omega receivers for selecting the time slot corresponding to station X. A phase-locked loop 12 is responsive to the received Omega signal for generating a continuous 10.2 kHz. signal phase-locked to the received Omega signal. A frequency changer in the form of a frequency divider 14 steps down the frequency of the 10.2 kHz. signal to a local or Alpha signal in the form of an audio tone having frequency (10.2/M) kHz. The output of the divider is coupled to a transmitter 16 which single-side-band modulates a high frequency (1,632 kHz) carrier was in accordance with the Alpha signal. The transmitter is keyed ON at the same ten second interval used by the Omega stations, but during a time slot different from the time slot occupied by the Omega signal of station X, the transmitter being keyed OFF at all other times. This procedure provides higher system accuracy and stability than can be obtained using conventional differential Omega techniques, which typically employ correction intervals from one to fifteen minutes or longer.

Figure 3:
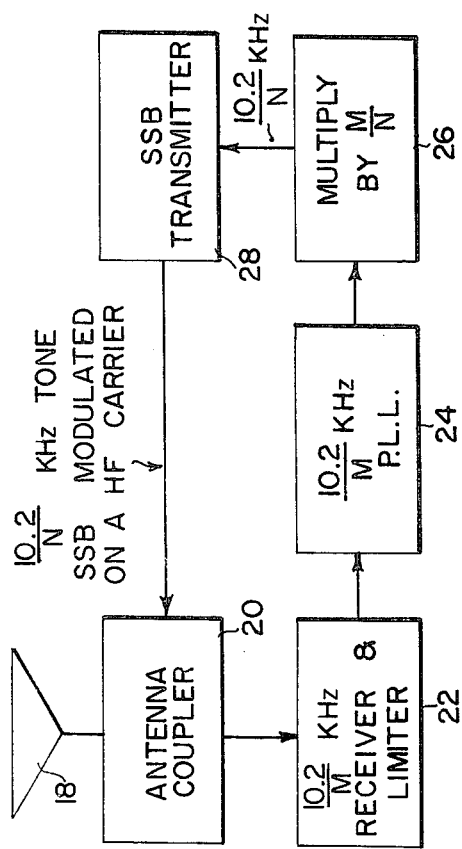

Referring to FIG. 3, in a preferred embodiment Alpha station B includes an antenna 18, antenna coupler 20, and a receiver and limiter 22 responsive to the carrier wave transmitted by station A. The receiver may be synchronized with the ON time slots of the transmitter of station A by synchronizing means of the type utilized in conventional Omega receivers. Phase-locked loop 24 is coupled to the receiver for generating a continuous (10.2/M) kHz. signal in response to the periodically received Alpha signals. Transmitter 28 may modulate a high-frequency carrier wave of the same frequency as that transmitted by station A in accordance with the received (10.2/M) kHz., the Alpha signal being keyed ON and OFF in the same manner as the transmitter of station A to produce periodic bursts of Alpha-modulated carrier wave in time slots different from the transmitting periods of stations A and X. Furthermore, a frequency changer 26 of factor (M/N) comprising frequency divider and/or multiplier circuits, may be provided for converting the audio tone of the received Alpha signal to an audio tone of frequency (10.2/N) kHz. for modulating the carrier wave.

The use of time-sharing and multiple audio frequencies can provide virtually unlimited extension of coverage with just a single HF carrier frequency allocation. Different audio tone frequencies are derived by using different values of M and N (FIGS. 2 and 3). For example, the values of M and N from 10 to 15 provide a range of audio frequencies between 680 Hz and 1,020 Hz. Furthermore, Alpha signal transmissions can utilize the same ten-second repetition interval of Omega stations, thereby providing eight different timing assignments. Combining this with six different audio frequencies results in a total of 48 non-interfering channels. However, full compatibility with the Omega Navigation System is still maintained if shorter intervals are used for the Alpha transmissions. If, for example, a minimum interval of 0.25 second were used, with a separation interval of 0.05 second, a total of 240 stations could be implemented without the possibility of mutual interference.

Because the Alpha stations utilize conventional compact, low cost single-side-band (full carrier) transmission apparatus, 100 percent duplication of the apparatus at each station is practical. Use of duplicate apparatus in conjunction with appropriate automatic or remotely activated switching equipment eliminates the need for base station attendants thereby greatly reducing the operating cost of the system.

Figure 4:
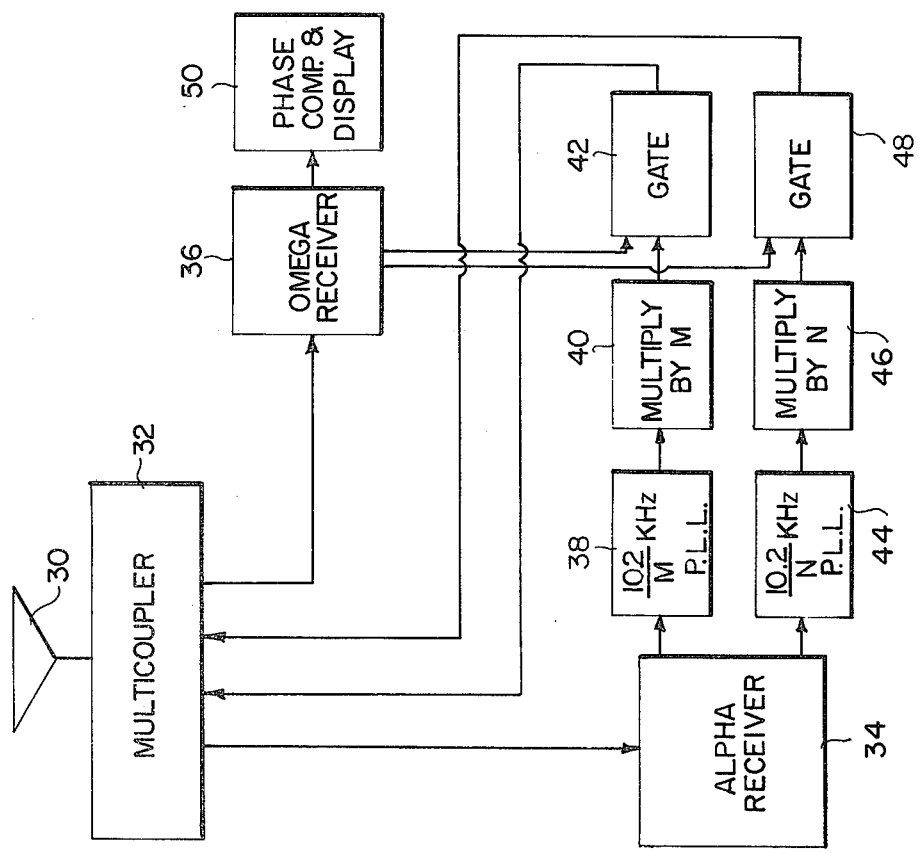
FIG. 4 is a block diagram of the receiver of the invention.

The Alpha signals are received and are frequency up-converted to the 10.2 kHz. Omega frequency by frequency changers in the shipboard Alpha-Omega receiver shown in FIG. 4. The mobile shipboard receiver includes antenna 30 and multicoupler 32 which receive both Alpha signals and the Omega signal and apply those signals to the Alpha receiver 34 and Omega receivier 36, respectively. Alpha receiver 34 is responsive to the two Alpha-modulated carrier waves and includes conventional frequency separating circuit means for providing the (10.2/M) kHz. and (10.2/N) kHz. Alpha signals at respective output terminals. Responsive to the (10.2/M) Alpha signal are, successively, 10.2 kHz. phase-locked loop 38, a frequency changer 40 preferably in the form of a frequency multiplier having factor M, and a gate circuit 42 which is controlled by a conventional synchronizing circuit in the Omega receiver for applying the 10.2 kHz signal derived from the (10.2/M) kHz. Alpha signal to the antenna terminal of the Omega receiver by way of multicoupler 32 during an Omega time slot different from the slot occupied by the Omega signal of station X. Similarly responsive to the (10.2/N) kHz. Alpha signal are phase-locked loop 44, frequency multiplier 44 having factor N, and gate 48 which applies the 10.2 kHz. signal derived from the (10.2/N) kHz. Alpha signal to the multicoupler during a time slot different from the slots occupied by the Omega signal of station X and the signal derived from the (10.2/M) kHz. Alpha signal. When the mobile receiver is operating in the Alpha-Omega mode, the Omega transmitter tracks the Omega signal of station X and the 10.2 kHz. signals derived from the signals transmitted by station A and B in the usual manner of Omega receivers.

The output of the Omega receiver is coupled to phase comparator and display circuit 50 which phase compares different pairs of 10.2 kHz. signals to derive position information in a well-known manner. When the vessel carrying the receiver is located on the high seas, the mobile receiver is operated in the conventional Omega mode. In traffic confluence areas the Alpha-Omega mode is selected, wherein the phase of the 10.2 kHz. signal derived from the Alpha signal transmitted by station A is compared with the phase of the Omega signal of station X and with the phase of the 10.2 kHz. signal derived from the Alpha signal of station B for providing an indication of position in the usual manner.

Figure 5:
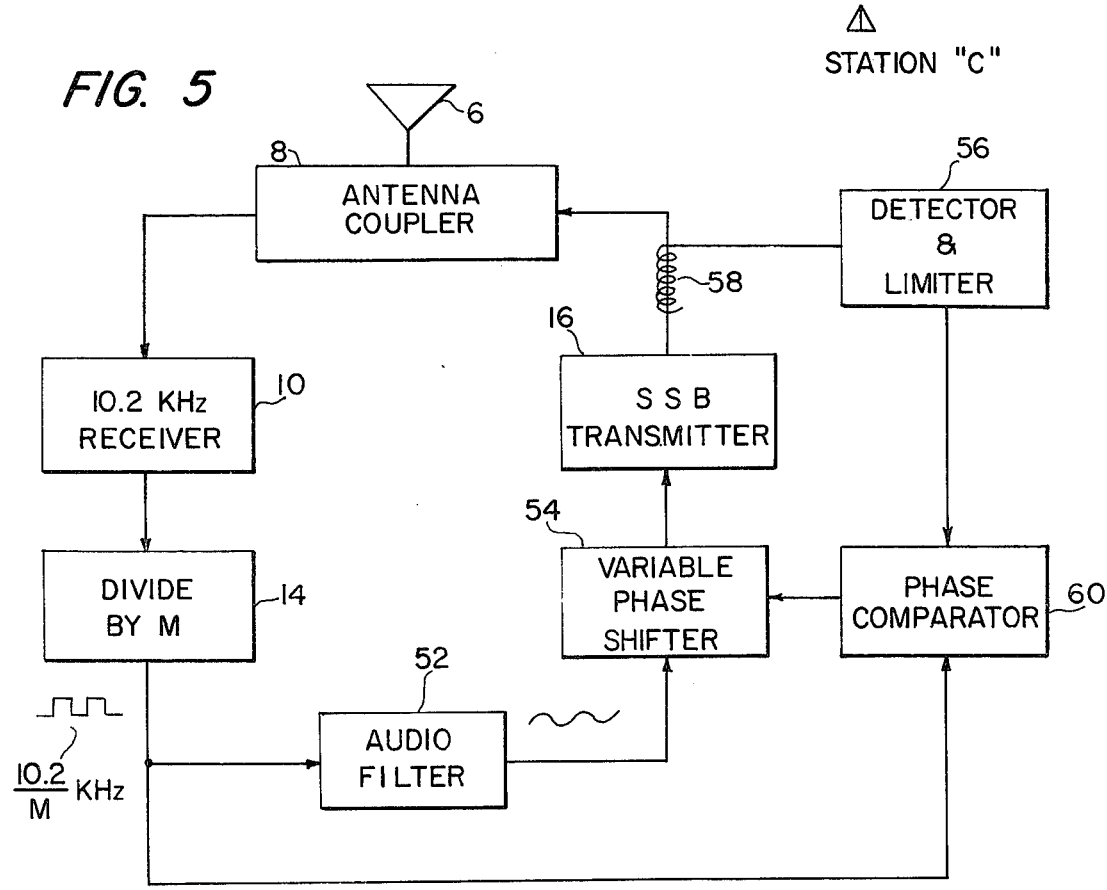
FIG. 5 is a block diagram showing a modification of the station of FIG. 2.

FIG. 5 shows another embodiment of an Alpha station similar to that illustrated in FIG. 2 but including circuitry for stabilizing the phase of the transmitter 26. The output of the divider 14 is filtered by audio filter 52 for producing a sine wave which is applied to the transmitter through a variable phase shift circuit 54. Detector and limiter circuit 56 is electromagnetically coupled to the output of the transmitter for deriving the modulation envelope corresponding to the Alpha signal. The phase of the derived modulating signal is then compared with the output of divider 14 by phase comparator 60 which controls the phase of the (10.2/M) kHz. signal for effecting phase-locking of the output of the transmitter and the received Omega signal.

The techniques developed for Alpha-Omega can be readily modified to solve the problem of high-accuracy navigation in harbor and harbor entrance zones. A third shore station C (FIG. 1) functioning as a "master" for two existing Alpha stations (just as one of the Omega stations functions as a master in the foregoing description) forms with the existing Alpha stations an "inward-looking" three-station network. The existing Alpha stations (A and B) are phase-locked to the master C using separate tracking loops from those used to generate the "outward-looking" Alpha-Omega coverage set forth above. Each of the three stations may transmit an audio tone modulated on a high frequency carrier. Separate transmission time segments are preferably used for the inward-looking system. With careful selection of station sites, excellent line-of-position geometry can be preserved throughout the more limited coverage area of the harbor and harbor entrance. The problem of switching to the inward-looking system is greatly facilitated, since one base line is common to both systems and since the 8-mile lane of Omega is preserved. The use of a self-contained crystal reference would have the effect of eliminating the large phase excursions which characterize the Omega signal. If desired, a shorter up-date interval (such as 3 seconds) may be employed to get higher accuracy.

While the Alpha Omega system of the invention provides an 8 mile lane width, excellent geometry and full compatibility with existing Omega equipment, this technique does produce a unique coordinate geometry, requiring separate navigational charts. This feature does not, however, appear to represent any real disadvantage since separate high resolution charts are normally used for coastal navigation, apart from the large scale charts employed for high seas navigation. Since existing Omega charts are drawn to a very large scale, even a conventional differential Omega technique would require the production of special high resolution charts for use in coastal waters.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. A high-resolution local radio navigation system employing a remote VLF transmitting station, said system comprising first and second local stations which are spaced from each other by a distance which is substantially less than the distance between said remote station and either one of said local stations so as to provide a short base line between said local stations and a substantially longer base line between said first local station and said remote station, said first and second local stations including means for transmitting, at higher frequency than VLF frequencies, first and second local signals, respectively, which are each phase-locked to a VLF signal transmitted by said remote station, said first local signal being cooperable with said VLF signal to produce a first family of equiphase lines corresponding to said first local station and said remote station and further being cooperable with said second local signal to produce a second family of equiphase lines corresponding to said first and second local stations, and a mobile receiver having means for comparing the phase of said first local signal with the phases of said second local signal and said VLF signal to provide an indication of the position of the receiver in relation to said families of equi-phase lines.

2. A radio navigation system as set forth in claim 1, wherein one of said local stations includes means responsive to said VLF signal for generating the associated one of said local signals.

3. A radio navigation system as set forth in claim 2, wherein said means for generating said one signal comprises frequency-changing means for generating said one local signal with a frequency different from the frequency of said VLF signal.

4. A radio navigation system as set forth in claim 3, wherein said frequency-changing means comprises a frequency divider for generating said first local signal in the form of an audio tone.

5. A radio navigation system as set forth in claim 2, wherein said means for transmitting said one local signal includes means for modulating a carrier wave with said one local signal.

6. A radio navigation system as set forth in claim 2, wherein said one local station is keyed ON periodically during predetermined time slots and is keyed OFF at all other times.

7. A radio navigation system as set forth in claim 2, wherein the other local station includes means responsive to said one local signal for generating the other local signal.

8. A radio navigation system as set forth in claim 7, wherein said means for transmitting said other local signal includes means for modulating a carrier wave with said other local signal.

9. A radio navigation system as set forth in claim 7, wherein said other local station is keyed ON periodically during predetermined time slots and is keyed OFF at all other times.

10. A radio navigation system as set forth in claim 7, wherein said means responsive to said one local signal comprises frequency-changing means for generating said other local signal with a frequency different from the frequency of said one local signal.

11. A radio navigation system as set forth in claim 1, wherein said other local signal is an audio tone.

12. A radio navigation system as set forth in claim 1, wherein said first and second local stations are spaced along a common shoreline.

13. A radio navigation system as set forth in claim 1, employing one of the transmitting stations of the Omega radio navigation network as said remote station, and wherein said VLF signal comprises an Omega signal transmitted by said one transmitting station.

14. A radio navigation system as set forth in claim 1, wherein said first and second local stations are positioned so as to make said short base line substantially perpendicular to said longer base line.

15. A radio navigation system as set forth in claim 1, wherein said means for transmitting said first and second local signals at higher frequency than VLF frequencies comprises means for modulating a carrier wave with said local signals.

16. A radio navigation system as set forth in claim 1, further comprising a third local station spaced apart from said first and second local stations, said third local station including means for transmitting, at higher frequency than VLF frequencies, a third local signal which is phase-locked to said VLF signal, said third local signal being cooperable with one of said first and second local signals to produce a third family of equiphase lines corresponding to said third local station and said one local station, whereby a mobile receiver having means for comparing the phases of said local signals can provide an indication of the position of the receiver with reference said second and third families of equi-phase lines.

17. A radio navigation system as set forth in claim 16, wherein said means for transmitting said first, second and third local signals at higher frequency than VLF frequencies comprises means for modulating a carrier wave with said local signals.

18. A mobile receiver for use in a local radio navigation system employing a remote VLF transmitting station and first and second local stations, said local stations being spaced from each other by a distance substantially less than the distance between said remote station and either one of said local stations so as to provide a short base line between said local stations and a substantially longer base line between said first local station and said remote station, and transmitting, at higher frequency than VLF frequencies, first and second local signals, respectively, which are each phase-locked to a VLF signal transmitted by said remote station, said first local signal being cooperable with said VLF signal to produce a first family of equi-phase lines corresponding to said first local station and said remote station and further being cooperable with said second local signal to produce a second family of equiphase lines corresponding to said first and second local stations, said receiver comprising:
means for receiving said VLF signal;
means for receiving said first and second local signals;
and
means for comparing the phase of said first local signal with the phase of said VLF signal to provide an indication of the position of the receiver relative to said first family of lines and for comparing the phase of said first local signal with the phase of said second local signal to provide an indication of the position of the receiver relative to said second family of lines.

19. A radio navigation receiver as set forth in claim 18 for use in a radionavigation system employing one of the transmitting stations of the Omega radio navigation network as said remote station, wherein said means for receiving said VLF signal comprises means for receiving an Omega signal transmitted by said one transmitting station.

20. A radio navigation receiver as set forth in claim 18, wherein the frequency of said local signals is different from that of the VLF signal, and further comprising means for changing the frequency of said local signals to the frequency of said VLF signal.

21. A radio navigation receiver as set forth in claim 18, wherein said local signals are transmitted as modulations of a carrier wave, and wherein said means for receiving said local signals includes means responsive to said modulated carrier wave for detecting said local signals.

22. A high-resolution local radionavigation system employing one Omega transmitting station of an Omega network, said system comprising first and second local stations which are spaced from each other by distance which is substantially less than the distance between the stations of the Omega network, said first and second local stations including means for transmitting, at higher frequency than Omega frequencies, first and second local signals, respectively, which are phase-locked to an Omega signal transmitted by said one Omega station, said first local signal being cooperable with said second local signal to produce a family of equi-phase lines corresponding to said first and second local stations, and a mobile receiver having means for comparing the phase of said first local signal with the phase of said second local signal to provide an indication of the line of position of the receiver in relation to said family of equi-phase lines.

23. A mobile receiver for use in a local radionavigation system employing one Omega transmitting station of an Omega network and first and second local stations, said local stations being spaced from each other by a distance substantially less than the distance between the stations of the Omega network and transmitting, at higher frequency than Omega frequencies, first and second local signals, respectively, which are each phase-locked to an Omega signal transmitted by said one Omega station, said first local signal being cooperable with said second local signal to produce a family of equi-phase lines corresponding to said first and second local stations, said receiver comprising:
means for receiving said first and second local signals; and
means for comparing the phase of said first local signal with the phase of said second local signal to provide an indication of the line of position of the receiver relative to said family of lines.

24. A local station for a high-precision local radionavigation system for use with one station of an Omega network, said local station comprising means for receiving an Omega signal transmitted only by said one Omega station; means for generating a continuous further signal that is phase-locked to said received Omega signal; frequency divider means responsive only to said further signal for dividing the frequency of said further signal and for generating an audio tone, the phase of which varies as a sub-multiple of the phase of the Omega signal; and means for transmitting a carrier wave modulated with said audio tone.

25. A local station as set forth in claim 24, further comprising means automatically stabilizing the phase of said transmitting means.

* * * * *